（12）United States Patent
Wilz et al.

(10) Patent No.: US 6,622,919 B1
(45) Date of Patent: *Sep. 23, 2003

(54) SYSTEM AND METHOD FOR ACCESSING INTERNET-BASED INFORMATION RESOURCES BY SCANNING JAVA-APPLET ENCODED BAR CODE SYMBOLS

(75) Inventors: David M. Wilz, Sewell, NJ (US); Carl Harry Knowles, Moorestown, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/308,804

(22) PCT Filed: Nov. 24, 1997

(86) PCT No.: PCT/US97/21975
§ 371 (c)(1),
(2), (4) Date: Apr. 14, 2000

(87) PCT Pub. No.: WO98/24050
PCT Pub. Date: Jun. 4, 1998

Related U.S. Application Data

(63) Continuation-in-part of application No. 08/916,694, filed on Aug. 22, 1997, now Pat. No. 5,905,248, and a continuation-in-part of application No. 08/905,903, filed on Aug. 4, 1997, now Pat. No. 6,152,369, and a continuation-in-part of application No. 08/891,599, filed on Jul. 11, 1997, now Pat. No. 5,905,251, and a continuation-in-part of application No. 08/887,785, filed on Jul. 3, 1997, now Pat. No. 6,027,024, and a continuation-in-part of application No. 08/869,164, filed on Jun. 4, 1997, now Pat. No. 5,992,752, and a continuation-in-part of application No. 08/846,219, filed on Apr. 25, 1997, now Pat. No. 6,076,733, and a continuation-in-part of application No. 08/820,540, filed on Mar. 19, 1997, now Pat. No. 6,068,188, and a continuation-in-part of application No. 08/753,367, filed on Nov. 25, 1996, now abandoned.

(51) Int. Cl.⁷ .............................................. G06K 7/10
(52) U.S. Cl. ................... 235/472.01; 235/375
(58) Field of Search ............... 235/462.01–462.45, 235/472.01–472.03, 375, 379, 494, 381, 383

(56) References Cited

U.S. PATENT DOCUMENTS

| 4,654,482 A | 3/1987 | DeAngelis |
| 4,841,132 A | 6/1989 | Kajitani et al. |
| 5,280,498 A | 1/1994 | Tymes et al. |

(List continued on next page.)

FOREIGN PATENT DOCUMENTS

| EP | 0 645 728 A2 | 3/1995 | ............ G06K/7/10 |
| EP | 0 744 856 A2 | 11/1996 | ............ H04M/3/42 |
| EP | 0 837 406 A2 | 4/1998 | |

(List continued on next page.)

OTHER PUBLICATIONS

PCT International Search Report, 1997.
U.S. patent application Ser. No. 08/691,263, Swift et al., filed Jan. 1, 2000.

(List continued on next page.)

Primary Examiner—Thien M. Le
(74) Attorney, Agent, or Firm—Thomas J. Perkowski, Esq., PC

(57) ABSTRACT

A novel transaction-enabling method and system (3) are disclosed, wherein a transaction-enabling Java-Applet is embedded within 2-D bar code symbol. One or more HTML-ecoded documents, including a framework-style HTML document, are created and stored in an server (2) for use in enabling the transaction process of the present invention. When a bar code symbol encoded with a transaction-enabling Applet is read using a bar code symbol reader (7A) interfaced with a Java-enabled Internet terminal, the corresponding HTTP document(s) are automatically accessed and displayed at the terminal, and the transaction-enabling Java-Applet initiated for execution so that the customer, consumer or client desiring the transaction can simply and conveniently conduct the information-related transaction over the Internet. The transaction-enabling Internet terminal can be in the form of an Internet kiosk installed in a public location, in the manner as conventional ATMs.

8 Claims, 7 Drawing Sheets

U.S. PATENT DOCUMENTS

| | | |
|---|---|---|
| 5,288,976 A | 2/1994 | Citron et al. |
| 5,448,046 A | 9/1995 | Swartz |
| 5,483,052 A | 1/1996 | Smith, III et al. |
| 5,490,217 A | 2/1996 | Wang et al. |
| 5,506,697 A | 4/1996 | Li et al. |
| 5,600,833 A | 2/1997 | Senn et al. |
| 5,635,694 A | 6/1997 | Tuhro |
| 5,640,193 A | 6/1997 | Wellner |
| 5,692,073 A | 11/1997 | Cass |
| 5,804,803 A | 9/1998 | Cragun et al. |
| 5,825,002 A | 10/1998 | Roslak |
| 5,869,819 A | 2/1999 | Knowles et al. |
| 5,902,353 A | 5/1999 | Reber et al. |
| 5,903,729 A | 5/1999 | Reber et al. |
| 5,905,248 A * | 5/1999 | Russell et al. ............... 235/462 |
| 5,905,251 A | 5/1999 | Knowles |
| 5,918,213 A | 6/1999 | Bernard et al. |
| 5,918,214 A | 6/1999 | Perkowski |
| 5,930,767 A | 7/1999 | Reber et al. |
| 5,933,829 A | 8/1999 | Durst et al. |
| 5,938,726 A | 8/1999 | Reber et al. |
| 5,940,595 A | 8/1999 | Reber et al. |
| 5,950,173 A | 9/1999 | Perkowski |
| 5,971,277 A | 10/1999 | Cragun et al. |
| 5,978,773 A | 11/1999 | Hudetz et al. |
| 5,979,757 A | 11/1999 | Tracy et al. |
| 5,986,651 A | 11/1999 | Reber et al. |
| 5,992,752 A * | 11/1999 | Wilz et al. ............... 235/462.01 |
| 5,995,105 A | 11/1999 | Reber et al. |
| 6,012,102 A | 1/2000 | Shachar |
| 6,027,024 A | 2/2000 | Knowles |
| 6,032,195 A | 2/2000 | Reber et al. |
| 6,064,979 A | 5/2000 | Perkowski |
| 6,081,629 A * | 6/2000 | Browning ................... 383/313 |
| 6,081,827 A | 6/2000 | Reber et al. |
| 6,108,656 A | 8/2000 | Durst et al. |
| 6,138,151 A | 10/2000 | Reber et al. |
| 6,199,048 B1 | 3/2001 | Hudetz et al. |
| 6,227,450 B1 * | 5/2001 | Blake et al. ............ 235/462.36 |
| 6,285,776 B1 * | 9/2001 | Rhoads ....................... 382/100 |
| 6,289,371 B1 * | 9/2001 | Kumpf et al. ............... 709/203 |
| 6,292,827 B1 * | 9/2001 | Raz ............................. 709/217 |
| 6,302,698 B1 * | 10/2001 | Ziv-El ........................ 434/323 |
| 6,334,117 B1 * | 12/2001 | Covert et al. ................. 705/43 |
| 2001/0022848 A1 * | 9/2001 | Rhoads ....................... 382/100 |
| 2001/0043273 A1 * | 11/2001 | Herrod et al. .............. 348/220 |
| 2001/0052083 A1 * | 12/2001 | Willins et al. .............. 713/201 |
| 2002/0019985 A1 * | 2/2002 | Fuccello et al. ............ 725/133 |

FOREIGN PATENT DOCUMENTS

| | | | |
|---|---|---|---|
| EP | 856 812 A2 | 5/1998 | .......... G06K/17/00 |
| WO | WO 97/01137 | 1/1997 | |
| WO | WO 97/37319 | 10/1997 | |
| WO | WO 98/03923 | 1/1998 | |
| WO | WO 98/06055 | 2/1998 | |
| WO | WO 98/09243 | 3/1998 | |
| WO | WO 98/19259 | 5/1998 | |
| WO | WO 98/20411 | 5/1998 | |
| WO | WO 98/38761 | 9/1998 | |
| WO | WO 98/51035 | 11/1998 | |
| WO | WO 98/51036 | 11/1998 | |
| WO | WO 98/51077 | 11/1998 | |

OTHER PUBLICATIONS

AllPen Software Announces NetHopper at PC Expo Press Release Allpen Software, et. al., www.allpen.com, vol. 0, No. 0, 1998, p. 1.

ZooWorks' automatic catalogs enable easy URL sharing by Gess Shankar, Intranet World, 1997.

Bookmarks by David Noack, Web Guide Magazine, 1997, p. 33–35.

NetHopper 2.0 The World in the Palm of Your Hands by product description (no author), LandWare, Inc., vol. 0, No. 0, 1997, p. 1–2.

Magazine Guides That Help the Surfers by John Burks, New York Times, vol. 0, No. 0, 1996, p. D7.

IRIS IRISPen by under REVIEWS/SCANNERS, MacUser, vol. 0, No. 0, 1996, p. 54–55.

World–Wide Web: The Information Universe by Tim–Berners–Lee, et. al., Meckler Media, Westport, CT, 1992.

* cited by examiner

SYSTEM AND METHOD FOR ACCESSING
INTERNET-BASED INFORMATION
RESOURCES BY SCANNING JAVA-APPLET
ENCODED BAR CODE SYMBOLS

RELATED CASES

This Application is a National Phase Entry Application of International Application PCT/US97/21975 filed Nov. 24, 1997, which is a Continuation-in-Part of the following U.S. patent applications: Ser. No. 08/753,367 filed Nov. 25, 1996, now abandoned, Ser. No. 08/820,540 filed Mar. 19, 1997, now U.S. Pat. No. 6,068,188; Ser. No. 08/486,219 filed Apr. 25, 1997; now U.S. Pat. No. 6,076,733 Ser. No. 08/869,164 filed Jun. 4, 1997; now U.S. Pat. No. 5,992,752 Ser. No. 08/887,785 filed Jul. 3, 1997; now U.S. Pat. No. 6,027,024 Ser. No. 08/891,599 filed Jul. 11, 1997; now U.S. Pat. No. 5,905,251 Ser. No. 08/905,903 filed Aug. 4, 1997; now U.S. Pat. No. 6,152,369 and Ser. No. 08/916,694 filed Aug. 22, 1997 Now U.S. Pat. No. 5,905,248.

BACKGROUND OF INVENTION

1. Technical Field

The present invention is directed to a novel system and method for carrying out information-related transactions (e.g., electronic commerce) by reading bar code symbols embodying transaction-enabling Applets which are automatically launched and executed by the Internet browser of the information access terminal associated therewith.

2. Brief Description of the Background Art

Presently, most information-related transactions, including financial transactions, product-purchases, service procurement, insurance claim reporting, information-access, and the like, are carried out using the telephone and information (e.g., personal identification number, etc.) preprinted on a credit-size card which functions as a transaction card. Some financial transactions (e.g., cash deposits and/or withdrawals) require the use of special machines called automated teller machines (ATMs). While developments in telephony and speech technology have made telephone-based transactions more economical in recent years, there are nevertheless practical restrictions imposed on the types of transactions that one can easily carry out over the telephone.

In response to the shortcomings and drawbacks associated with telephonic-based transactions, many product vendors and service providers have launched Internet sites on the World-Wide Web (i.e., "Web-sites") to enable their customers to carry out various types of transactions using an Internet browser program, such as the Navigators from Netscape Communications, Inc. or the Internet Explorer® from Microsoft, Inc. While the development of the Hyper-Text Mark-up Language (HTML) and GUI-based Web browser programs have made accessing Web-sites relatively simple, the fact remains that many consumers are uncomfortable using conventional Web browsers, and thus would rather carry out transactions using the telephone. Consequently, these consumers cannot enjoy benefits associated with Internet-based information transactions, while product vendors and service providers cannot enjoy the savings and benefits associated with Internet-based transactions.

Thus, there is a great need in the art for an improved system and method of carrying out information-related transactions (as well as electronic commerce) over the Internet while avoiding the shortcomings and drawbacks of prior art systems and methodologies.

DISCLOSURE OF THE INVENTION

Accordingly, it is a primary object of the present invention to provide an improved method and apparatus for carrying out information-related transactions (as well as electronic commerce) over the Internet while avoiding the shortcomings and drawbacks of prior art systems and methodologies.

A further object of the present invention is to provide such apparatus in the form of a Transaction Enabling System, wherein a transaction-enabling Java-Applet encoded within a bar code symbol structure is read using a bar code symbol reader connected to a Java-enabled browser program running on the computing platform of the Transaction Enabling System, and in response thereto, a transaction-supporting Web page(s) is automatically accessed and served to Transaction Enabling System in order to enable the information-related transaction over the Internet.

A further object of the present invention is to provide such Internet Transaction System, wherein the bar code symbol reader may be a laser scanning bar code symbol reader, or a CCD-type bar code symbol,capable of reading 2-D bar code symbols.

Another object of the present invention is to provide such an Internet Transaction System in the form of a desktop, laptop or palmtop computer system that is connected to the Internet by way of an Internet Service Provider (ISP), wherein the system has a GUI-based web browser program and a programmed bar code symbol scanner interfaced therewith for automatically reading bar code symbols embodying transaction-enabling Java-Applets and executing the same upon the computing platform thereof supporting the Java-enabled browser program.

Another object of the present invention is to provide an Internet-based Transaction-Enabling System, in which Java™ Applets are encoded within the structure of 2-D bar code symbols printed on a credit card or other transaction-enabling card.

Another object of the present invention is to provide an Internet-based Transaction-Enabling System, in which Java™ Applets are encoded within the structure of PDF-type 2-D bar code symbols.

Another object of the present invention is to provide such a system and method, wherein the Transaction Enabling System is automatically connected to the Internet information resources specified by the scanned Applet-encoded bar code symbol, for local processing and display in accordance with the transaction-enabling Applet.

These and other Objects of the Present Invention will become apparent hereinafter.

BRIEF DESCRIPTION OF THE DRAWINGS

For a more complete understanding of how to practice the Objects of the Present Invention, the following Detailed Description of the Illustrative Embodiments should be read in conjunction with the accompanying Drawings, wherein.

BEST MODES FOR CARRYING OUT THE INVENTION

The illustrative embodiments of the present invention will be described with reference to the figure drawings wherein like elements and structures are indicated by like reference numbers.

Overview of the Internet-based Transaction-Enabling Method and System hereof In general, the system and method of the present invention is practiced in connection with a globally-based digital packed-switched telecommunications network (known as the Internet). The function of the Internet is to provide an infrastructure that supports wired and wireless 30 digital telecommunications throughout the world using the well known TCP/IP networking protocols. In general, the Internet infrastructure comprises Internet Service Providers (ISPs), Network Service Providers (NSPs), routers, telecommunication lines and channels. etc., all well known in the art.

Figure 1:
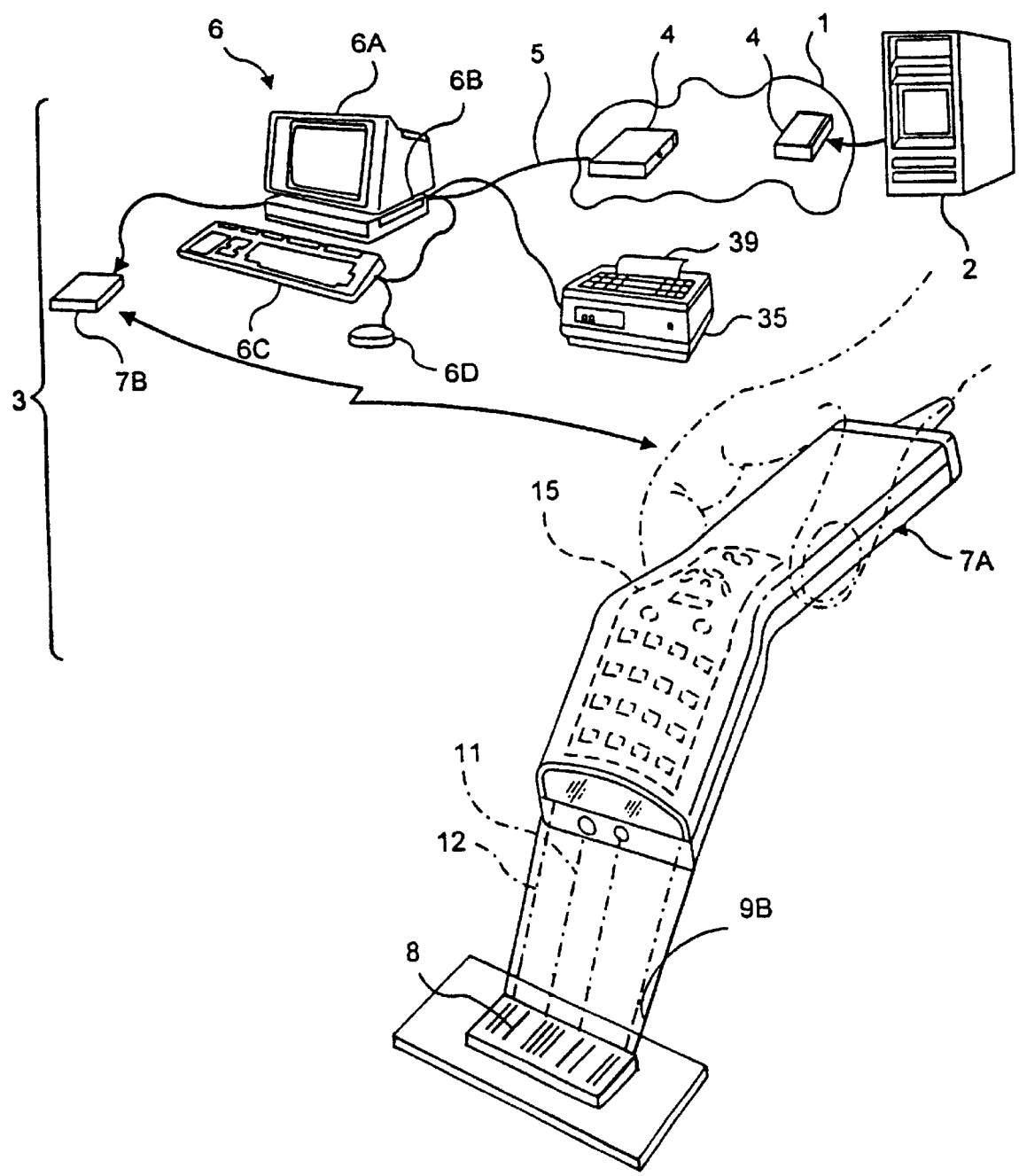
FIG. 1 is a schematic diagram of the first illustrative embodiment of the present invention, in which the Internet-based Transaction-Enabling System hereof is realized in the form of a desktop computer system shown connected to the Internet by way of an ISP, and having a GUI-based web browser program and a 2-D bar code symbol reader provided for reading Applet-encoded bar code symbols for the purpose of automatically launching transaction-enabling Web documents by scanning corresponding Applet-encoded bar code symbols printed on various types of media.

As shown in FIG. 1, many Internet Web-site Servers (i.e., information-serving computer systems) 2 physically located throughout the world are connected to the Internet 1 by way of the Internet infrastructure (i.e., ISPs and NSPs). As the name implies, the function of an Internet Server 2 is to serve information resources to Internet users when requested to do so by a client computer system equipped with an Internet browser. The location of each and every information resource on an information server connected to the Internet infrastructure is specified by a Uniform Resource Locator (URL), the syntax of which is well known in the art.

In accordance with the principles of the present invention, one or more transaction-enabling Java™-Applets and one or more transaction-serving HTML-encoded documents (i.e., Web pages) are created for the purpose of carrying out a particular information-based transaction. Each Java-Applet is designed to enable a particular transaction or aspect thereof to be carried out using one of the Internet-based Transaction-Enabling Systems of the present invention. Each transaction-serving HTML document is designed to assist in carrying out the transaction enabled by the Applet(s). Then the Java-Applet is embedded within a bar code symbol (e.g., 2-D PDF-type bar code symbol). As used hereinafter, such encoded bar code symbols shall be generally referred to as "Applet-encoded bar code symbols or "Applet-encoded symbols".

Each transaction-serving HTML-encoded document is stored in an HTTP server (i.e., Web server) along with the compiled code associated with the Java-Applet(s). The location of each transaction-serving HTML document is determined by a URL specified within the structure of the Applet. The function of the URL is to specify the location of the corresponding information file in the HTML server. The Applet-encoded bar code symbol is then printed on various types of print media. Java-Applet encoded bar code symbols of the present invention can be printed on or otherwise applied to various types of objects and/or media.

In general, when an Applet-encoded bar code symbol is read using an Internet access system hereof, information resources related to the transaction associated therewith are automatically accessed, processed and displayed in accordance with the encoded Java-Applet in order to enable carrying out the information-based transaction.

More specifically, when a Java-Applet encoded bar code symbol is scanned by a bar-code driven Internet access system hereof, the Java-enabled browser associated therewith automatically receives the Applet and executes the same in the following manner. First, the compiled Applet code stored (typically on an Internet server) at the URL specified in the Applet is transferred from an HTTP server to the Java-enabled browser associated with the client system scanning the Applet-encoded bar code symbol. During the execution of the Applet code, specified information resources on the Internet are accessed, along with requested input provided by the user through key-pad entry, or the like, at the bar code driven Internet access system. Ultimately, information specified by the executed Applet is displayed to the user on the pre-created (framework-type) transaction-serving Web page, as shown, for example, in FIG. 7. Hereinafter, any client computer system capable of scanning and executing Applet-encoded bar code symbols shall be referred to as an "Transaction-Enabling System", "Internet-based Transaction-Enabling System" or "Internet Transaction-Enabling Terminal", generally indicated by reference number 3 in the figure drawings.

Having provided an overview on the method of the present invention, it is appropriate to now describe the particular illustrative embodiments of the Internet access system of the present invention.

In general, each Internet Information Server (e.g. HTTP server) 2 and client system 3 may be connected to the Internet infrastructure by way of an ISP 4 (or NSP) using physical communication media or a wireless (RF-based) digital communication link 5 well known in the art. Notably, while each illustrative embodiment of the Internet-based Transaction-Enabling System hereof is realized in the form of a Client System operably connected to the infrastructure of the Internet by way of an ISP, it is understood that the Internet connection may be achieved through an NSP or other access point in the Internet infrastructure. In the illustrative embodiments, each HTTP Server 2 is realized as a computer system running conventional HTTP server software (e.g., WebStar® from StarNine, Inc., FASTRAK™ Server from Netscape Communications, Inc, or Microsoft® Internet Information Server from Microsoft Corporation) and is interfaced with an ISP in a conventional manner. Each HTTP Server is assigned a unique TCP/IP address (and Domain Name) on the Internet, and is provided with Internet networking software to support the TCP/IP protocol. In addition, each HTTP server is provided with one or more application software programs for creating and maintaining hypermedia documents containing text, graphics and audio information within an information file structure expressed in HTML, TVML or other form of the standard markup language well known in the art. Each HTML document on the WWW is physically served from an HTTP Server 2, at a location specified by its URL.

First Illustrative Embodiment of the Internet-based Transaction-Enabling System hereof As illustrated in FIG. 1, the first illustrative embodiment of the Internet-based Transaction-Enabling System hereof 3 is realized in the form of a bar code driven desktop computer system 6. As shown, the desktop computer system consists of a video monitor 6A, a processor 6B, keyboard 6C, mouse 6C, and Postscript® laser printer 35, and is connected to the Internet by way of an ISP 4. The computer system 6 has a GUI-based web browser program and a hand-held, wireless laser scanning bar code symbol reading system 7 which is connected to the communication port of this host system in a conventional manner. In the preferred embodiment, wireless bar code symbol reading system 7 comprises a hand-supportable 2-D (raster) laser scanning bar code symbol reading device 7A and a base unit 7B which receives RF signals transmitted from device 7A upon the successful reading of each 2-D bar code symbol thereby; the base unit 7B produces an acoustical acknowledgement signal in response to each such successful read. System 7 can be realized by any one of the (i) wireless bar code symbol reading systems disclosed in EPO Publication No. EP 0 715 273 A2, or (ii) tethered bar code symbol reading systems disclosed in published PCT Publication No. WO93/06565, each said publication being incorporated herein by reference. Examples of 2-D (laser scanning) bar code symbol reading devices that can be used to construct "2-D type" Internet-based Transaction-Enabling Systems according to the principles of the present invention are disclosed in the following U.S. Pat. Nos.: 5,594,232; 5,523,552; 5,504,316; 5,414,250; 5,373,148; 5,319,181. Each of these U.S. patents is incorporated herein by reference in its entirety. In other embodiments of the present invention, one may employ scanning modules capable of reading both 1-D and 2-D type bar code symbols.

The function of programmed bar code symbol reader 7 is to read a 2-D bar code symbol 8 that is encoded with the computer code associated with a Java-Applet (i.e., miniprogram); and produce character data representative thereof for use by the Internet browser program of its associated Internet Terminal.

In the illustrative embodiment, the Internet Transaction-Enabling Terminal (realized by desktop computer system 6) can be realized by any conventional GUI-based Internet browser program, such as the Navigator® from Netscape, appropriately modified by the addition of a Plug-in Module (e.g., browser subprogram) that: (i) automatically reads information from a scanned Applet-encoded bar code symbol information, and stores the same within an addressed data buffer at the I/O port of the client computer platform 6 (supporting the Internet access terminal); and (ii) automatically executes the decoded Applet while the framework-style transaction-serving web-page is displayed to the consumer at the requesting client system. In such embodiments, it is preferred that each Internet-based Transaction-Enabling System has a preloaded Internet browser program provided with the above-described Plug-In Module, or the functionalities provided thereby. It is understood, however, that in some instances it may be desirable to distribute or download the browser program and plug-in module to client computer systems from an Internet-based Information Server on the WWW using the well known file transmission protocol (FTP). In this way, conventional client computer systems can be easily converted into Internet-based Transaction-Enabling Systems according to the present invention. In the preferred embodiments of the invention, the bar code symbol reading system 7 is a 2-D laser scanning bar code symbol reader which is connected to the data-input port of the client computer platform 6.

As mentioned hereinabove, each Applet-encoded bar code symbol of the present invention is preferably a 2-D bar code symbol structure having a PDF-417 symbology that allows for the encoding of the (ASCII-type) information contained within an Applet-type information structure, the syntax of which is well known in the art.

Figure 2:
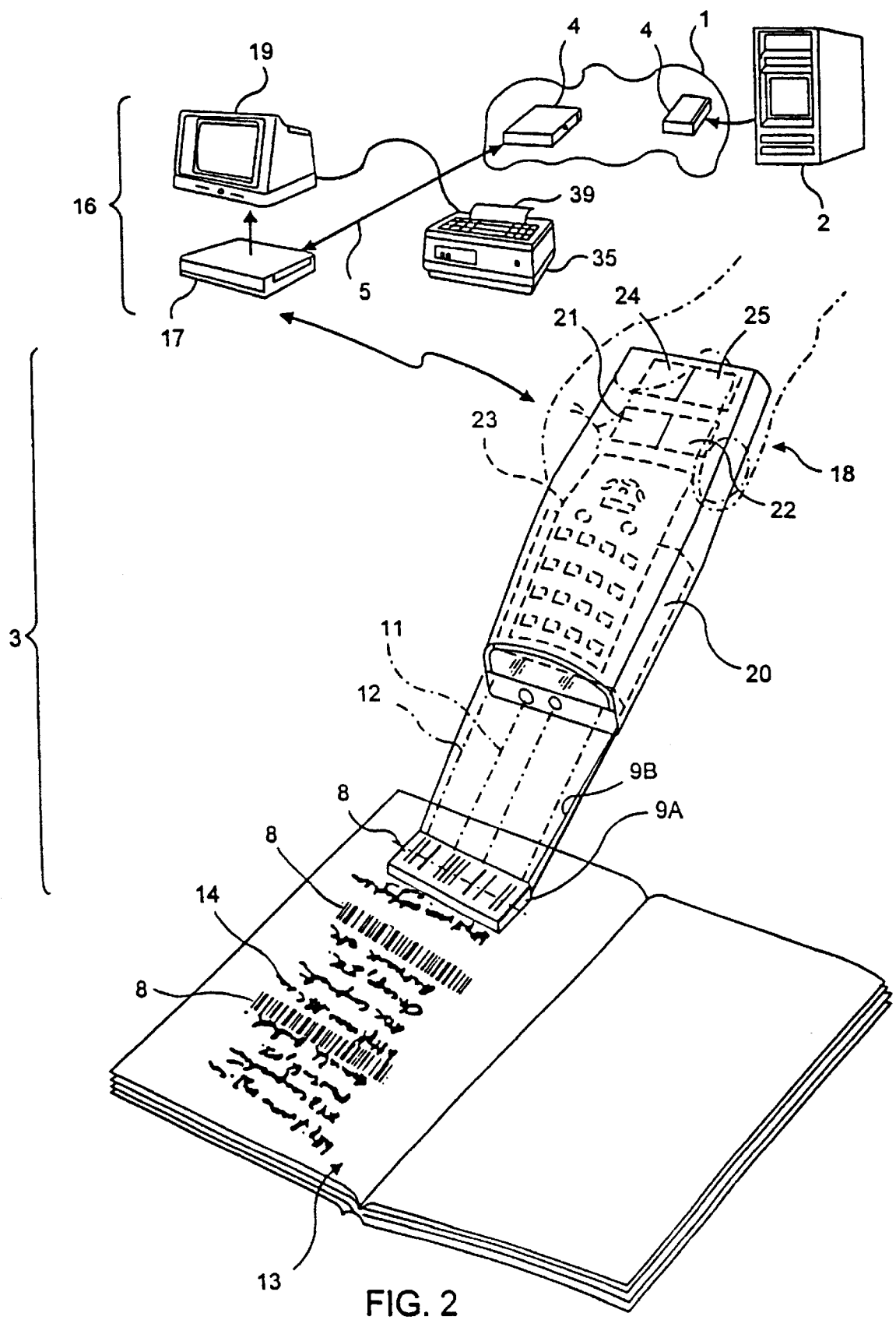
FIG. 2 is a schematic diagram of the second illustrative embodiment of the present invention, in which the Internet-based Transaction-Enabling System hereof is realized in the form of an interactive Web-based television system which comprises an Internet Terminal Unit shown connected to the Internet by way of an ISP and has portable Internet Navigation (i.e., surfing) Device having an IR-link to the Terminal Unit, and a 2-D bar code symbol scanner integrated therewith, for the purpose of automatically launching transaction-enabling Web documents for carrying out information-based transactions over the Internet by scanning corresponding Applet-encoded bar code symbols printed on various types of media.

Second Illustrative Embodiment of the Internet-based Transaction-Enabling System Hereof As illustrated in FIG. 2, the second illustrative embodiment of the Internet-based Transaction-Enabling System hereof is realized in the form of an interactive Web-based television system 16. Any of the generalized Internet access methods described hereinabove can be used to carry out this particular embodiment of the present invention.

As shown, interactive web-based television system 16 comprises an Internet Terminal Unit 17, a Remote Control Scanning Device 18 and a standard (NTSC or PAL) color television set 19. As shown, the Internet Terminal Unit 17 is connected to the Internet by way of an ISP 4 and includes means for supporting: (i) a GUI-based Internet browser program such as the Internet Navigator® from Netscape Communications; and (ii) the TCP/IP networking protocol on the Internet. In the preferred embodiment, the Internet Terminal Unit 17 can be realized using any one of a number of commercially available Internet Terminal devices, such as, for example: the Mediamaster 9500™ Internet Terminal from Nokia, Inc.; the NetStation™ Internet Terminal from Acorn Computer; or the "Internet Digital Appliance" from Diba.

As shown in FIG. 2, the Remote Control Scanning Device 18 of the second preferred embodiment can be realized by integrating a miniature automatic 2-D bar code symbol reading module 20 into the wireless remote control device that is provided with the commercially available terminal unit that is used to practice this embodiment of the present invention. Preferably, automatic bar code symbol reading module 20 is similar to the device described in great detail in EPO Application No. EP 0 715 273 A2, modified to generate a 2-D raster scanning pattern. Such laser scanning engines, as they are called, are commercially available from Metrologic Instruments, Inc., of Blackwood, N.J., under the tradename ScanQuest®. The manner in which such a laser scanning engine can be integrated into any one of the remote control devices of the above-identified Internet Terminals, and thus provide the Remote Control Scanning Device 18, will be described below.

The Mediamaster 9500™ Internet Terminal from Nokia, Inc., the NetStation™ Internet Terminal from Acorn Computer, or the Internet Digital Appliance from Diba, are each provided with a wireless remote control device which includes a programmable microcontroller (i.e., microprocessor) operably connected to a system bus of one sort or another. The system subcomponents that are connected to this system bus structure include, for example: program memory realized in the form of EPROM 21; data storage memory realized in the form of RAM 22; a keypad 23, data storage registers and interface circuitry; an IR-based communication circuit and interface circuitry 24; and a power supply and power distribution circuitry 25. In such commercial products, no visual display device (e.g., LCD panel) is provided, as all display functions are provided on the television screen using an on-screen display format well known in the art. Integration of an automatic 2-D Laser Scanning Module into the system architecture of such wireless remote control devices can be achieved by adding additional data registers to the system bus, and connecting the data output port of the scanner to such registers in a conventional manner. Additional control logic will have to be provided by the microcontroller in to provide scan data from the scanner to have priority over data entered manually into the system. All such modifications are within the ordinary skill in the art. As shown in FIG. 2, Remote Control Scanning Device 18 automatically produces a laser scanning beam 12 when an object (e.g., transaction cord or guide) 13 is automatically detected by the object detection field 11.

While any standard (NTSC or PAL) color television set can be used in connection with the Internet Terminal 17 to display graphical and audio information content associated with any particular Web-site accessed by the system, it is preferred that a higher-resolution (VGA or SVGA) computer monitor is used in connection therewith to display high resolution graphics.

Figure 3:
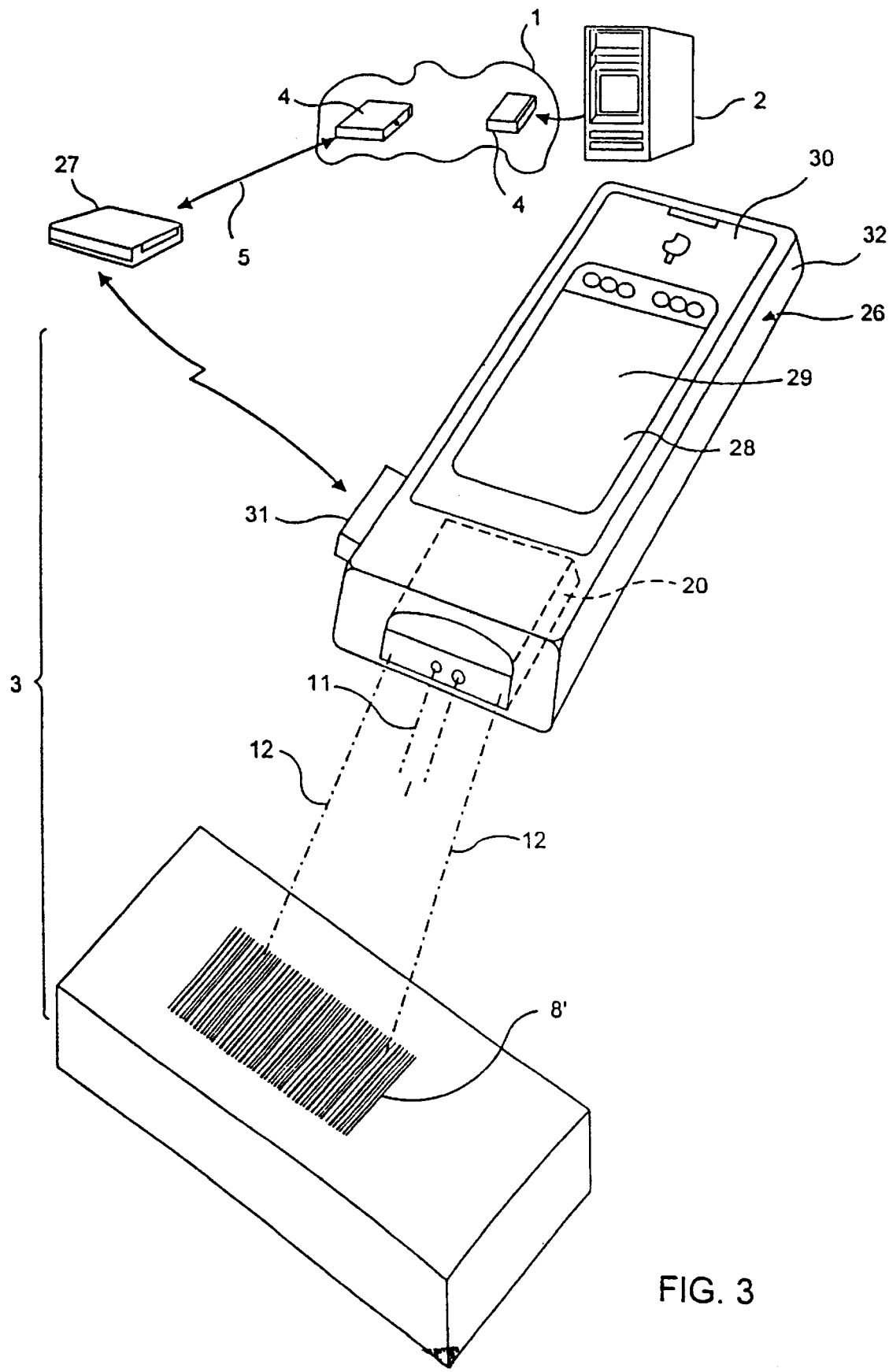
FIG. 3 is a schematic diagram of a third illustrative embodiment of the present invention, in which the Internet Access System hereof is realized in the form of a hand-held Scanner Terminal shown connected to the Internet by way of a wireless link to an ISP, and having an integrated GUI-based web browser program, display panel, keypad, and programmed 2-D bar code symbol scanner for automatically scanning Java-Applet encoded bar code symbols printed on various types of objects and media.

Third Illustrative Embodiment of the Internet-based Transaction-Enabling System hereof As shown in FIG. 3, the third illustrative embodiment of the Internet-based Transaction-Enabling System hereof is realized in the form of a hand-held Integrated Scanning Terminal 26. Any of the generalized Internet access methods described herein can be used to carry out this particular embodiment of the present invention. The Internet Scanner Terminal 26 is shown connected to an ISP 4 by way of a radio-base station 27 and wireless link 5. The hand-held Internet Scanning Terminal 26 has an integrated GUI-based web browser program, display panel 28, touch-screen type keypad 29, and programmed bar code symbol scanner 20. The function of bar code symbol scanner 20 is to read a bar code symbol 8 that is encoded with the transaction enabling Java-Applet that is to be executed by the Internet-based Transaction-Enabling System, and produce symbol character data representative of the Java-Applet for transmission to the Java-enabled browser associated with the scanned bar code symbol. Examples of 2-D (laser scanning) bar code symbol reading devices that can be used to construct "2-D type" Internet-based Transaction-Enabling Systems according to the principles of the present invention are disclosed in the following U.S. Pat. Nos.: 5,594,232; 5,523,552; 5,504, 316; 5,414,250; 5,373,148; 5,319,181. Each of these U.S. patents is incorporated herein by reference in its entirety.

In the illustrative embodiment, the Internet Scanner Terminal 26 is realized as a transportable computer, such as the Newton® Model 130 Messagepad 30 from Apple Computer, Inc. of Cupertino, Calif. This device is provided with NetHopper™ brand Internet Access Software from which supports the TCP/IP networking protocol within the Newton MessagePad operating system. The Newton Messagepad is also equipped with a Motorola PCMICA-based modem card 31 having a RF transceiver for establishing a wireless digital communication link with either (i) a cellular base station, or (ii) one or more satellite-base stations (27) connected to the Internet by way of an ISP 4 in a manner well known in the global information networking art. In the illustrative embodiment, an automatic 2-D laser scanning engine 20 is interfaced with the serial communications port of the Newton MessagePad so as to realize the Internet-based Transaction-Enabling System of the third preferred embodiment hereof.

As shown in FIG. 3, the entire Newton MessagePad, 2-D Laser Scanning Module 20 and auxiliary battery supply (not shown) are completely housed within a rubberized shock-proof housing 32, in order to provide a hand-supportable unitary device. Once the object (e.g., transaction card) 13 is detected by the object detection field 11, a laser beam 12 is automatically projected and swept across the Applet-encoded symbol 8 thereon.

Optionally, in each of the three particular embodiments of the Internet-based Transaction-Enabling System described above, the bar code symbol scanner can be replaced by a programmed optical character reader realized using, for example, the automatic holographic laser scanning technology disclosed in great detail in Applicant's PCT Publication No. WO97/22945, incorporated herein by reference. The function of the programmed optical character reader is to allow the Internet Access Terminal to access any transaction-enabling Web page by optically scanning the alphanumeric character string comprising the URL thereof, and providing the same as output to the "Goto" Window of the GUI-based Internet browser program thereof. In such alternative embodiments, the function of the optical character reader (i.e., character reading module) is to read the ASCII characters comprising the URL (and other encoded information) 14 printed on an object (e.g., transaction card, keychain, pen, pencil, bookmarker, guide, etc.), thereby avoiding the need for manual key entry operations.

Fourth Illustrative Embodiment of the Internet-based Transaction-Enabling System hereof In the above-illustrative embodiments, the bar code symbol reading device has been either supported within the hand of the operator, upon a countertop surface or the like. It is contemplated, however, that the bar code symbol reader and other client-side components of the Internet-based Transaction-Enabling System hereof can be worn on the body of its operator as illustrated in FIGS. 4 and 5.

Figure 4:
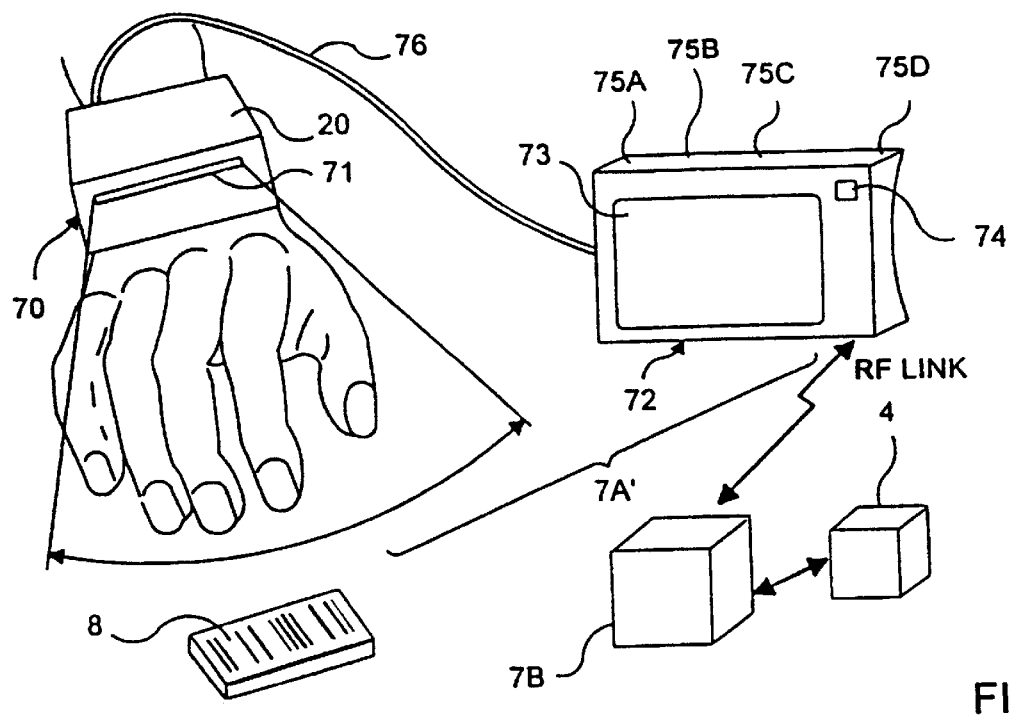
FIG. 4 is a schematic representation of the third illustrative embodiment of the present invention in the form of a body-wearable bar code symbol driven Internet-based Transaction-Enabling System, in which a forearm mounted remote unit containing a microcomputing system and a hand-mounted 2-D bar code symbol reader are provided for the purpose of automatically launching transaction-enabling Web documents for supporting Internet access of transaction-enabling Web pages by reading JavaApplet encoded bar code symbols printed on various types of objects and media.
Figure 4A:
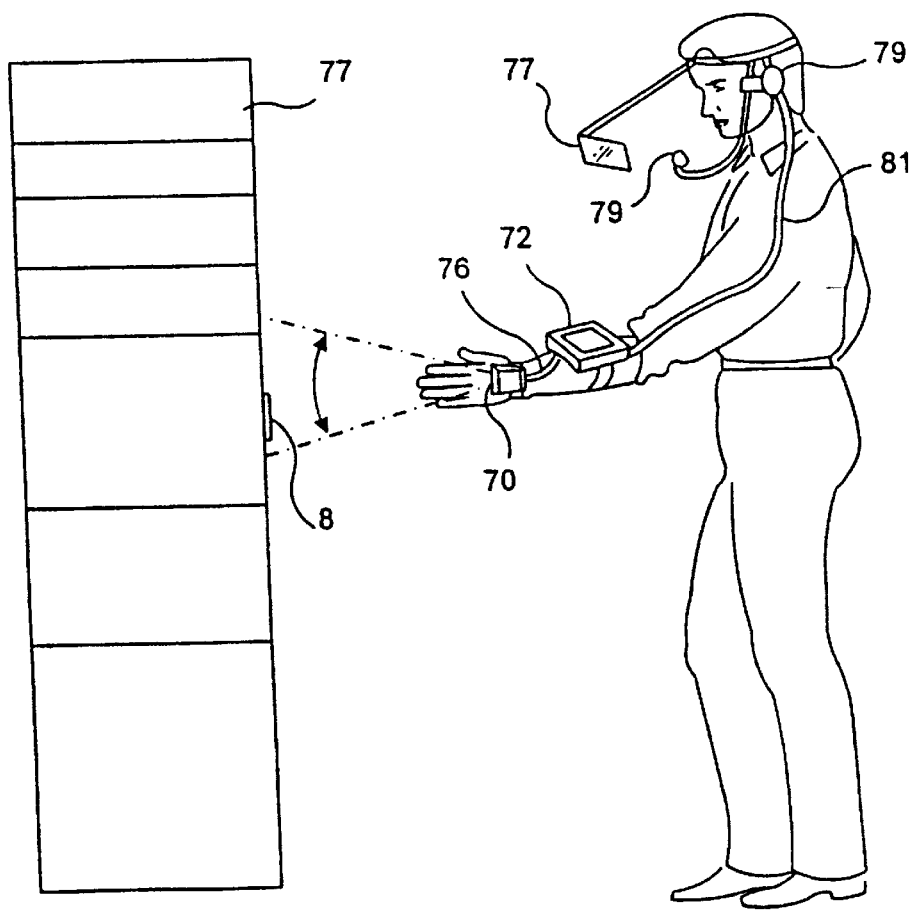
FIG. 4A is a schematic representation showing the body-wearable system of FIG. 4 being used to access information resources (e.g., audio and video information) from an Internet-enabled database during inspection and/or repair of a system or plant in accordance with the principles of the present invention.
Figure 5:
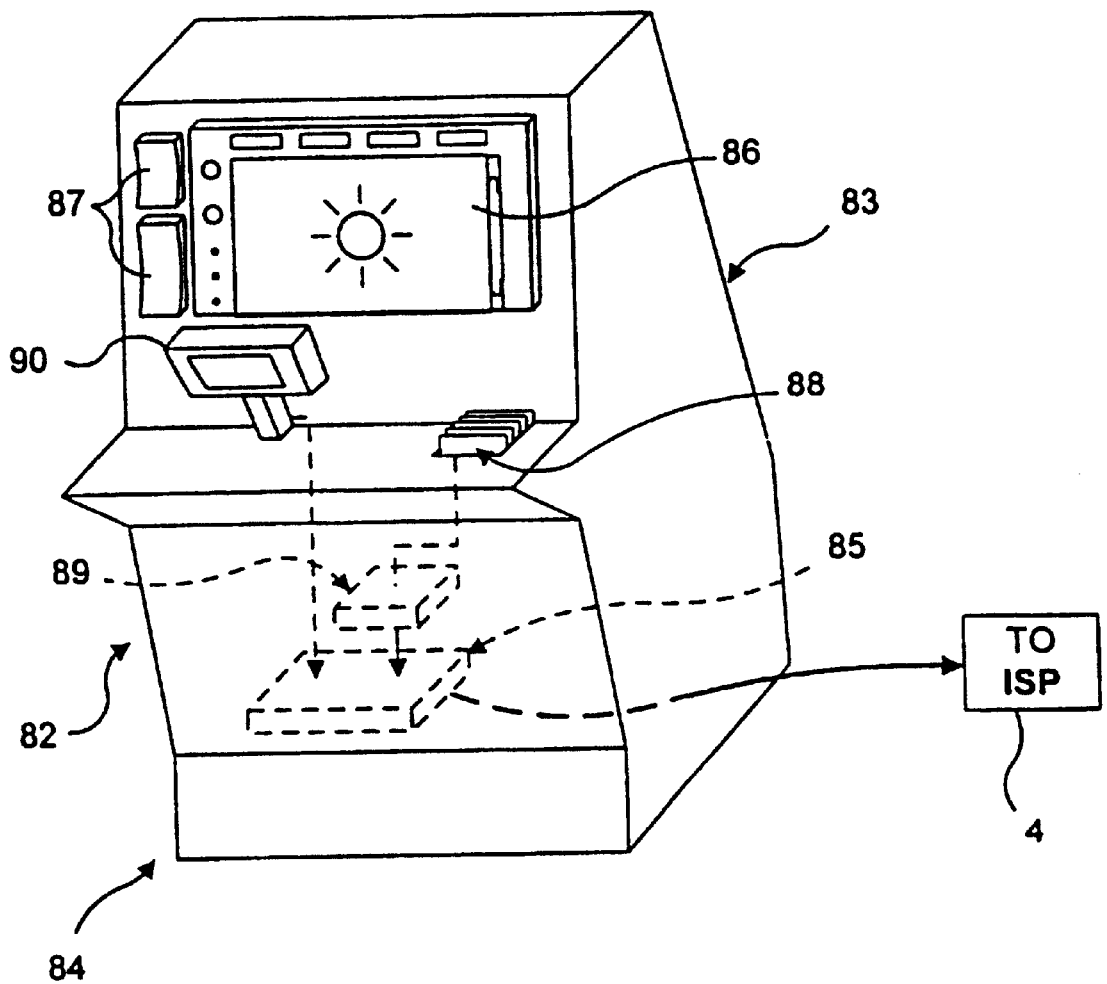
FIG. 5 is a schematic representation of the fourth illustrative embodiment of the present invention in the form of a kiosk-type Internet-based Transaction-Enabling System, in which a 2-D bar code symbol reader is provided for the purpose of automatically launching transaction-enabling Web documents for supporting Internet access of transaction-enabling Web pages by reading Java-Applet encoded bar code symbols printed on various types of objects and media.

As shown in FIGS. 4 and 4A, the body-wearable Internet-based Transaction-Enabling System of the present invention comprises: a bar code symbol scanning unit 70 designed to be worn on the back of the hand; and a remote unit 72 (i.e., body-wearable RF-based Internet access terminal) designed to be worn about the forearm or foreleg of the operator by fastening thereto using flexible straps or like fastening technology.

In the illustrative embodiment, hand-mounted scanning unit 70 comprises: a light transmission window 71 for exit and entry of light used to scan bar code symbols; a glove 70A worn by the operator for releasably mounting housing 70 to the back of his or her hand; and a 2-D laser scanning bar code symbol reader 20, as described hereinabove with respect to the other illustrative embodiments of the present invention. In other embodiments, other optical scanning devices may be used in lieu of unit 20 provided the depth of scanning provided thereto is satisfactory for the intended application.

In the illustrative embodiment, the remote unit 72 comprises: an LCD touch-screen type panel 73; an audio-speaker 74; a RISC-based microcomputing system or platform 75A for supporting various computing functions including, for example, TCP/IP, HTTP, and other Internet protocols (e.g., E-mail, FTP, etc.) associated with the use of an Internet browser or communicator program (e.g., Netscape Navigator or Communicator) provided by the remote unit; a telecommunication modem 75B interfaced with the microcomputing system; an RF transceiver 75C (e.g., employing DFSK or spread-spectrum modulation techniques) also interfaced with the telecommunication modem for supporting a 2-way telecommunication protocol (e.g., PPP) known in the art, between the microcomputing system and a remote transceiver 7B (described hereinabove) which is interfaced with ISP 4 connected to the Internet; a (rechargeable) battery power supply 75D aboard the remote housing, for providing electrical power to the components therein as well as to the bar code symbol reader 20; and a flexible cable 76, for supporting communication between the bar code symbol reader 20 and the microcomputing platform, and electrical power transfer from the power supply to the bar code symbol reader.

Optionally, a 2-D laser scanning bar code symbol scanner (without a digitizer or decoder) 20 can be contained within hand-mounted unit 70, and the necessary digitizing and scan-data processing can be carried out by the microcomputing system within the remote unit 72 using techniques well known in the art, or using special-purpose ASIC-type devices contained within remote unit 72 also well known in the art. Such construction techniques will allow the bar code scanning unit to be miniaturized small enough to be worn on the operator's finger, in a manner well known in the art. Preferably, activation of the bar code symbol scanning/reading unit is automatically controlled, as taught in Applicants' prior US and PCT Patent Publications, incorporated herein by reference but, where suitable, may be manually activated using a trigger switch or like device mounted on hand-supported unit 70 or elsewhere within the configuration of the system.

Preferably, the remote unit 72 is worn on the forearm of the operator so that the touch-type LCD panel 73 integrated therewith can be easily viewed during use of the body-wearable system of the present invention. Thus, when an Applet-encoded bar code symbol is read by the hand-mounted (or finger-mounted) bar code symbol reader 20, the transaction-enabling framework-style Web page associated with the scanned bar code symbol and displayed on the LCD panel 73 can be easily viewed by and interacted with by the operator. Also, in response to reading an Applet-encoded bar code symbol (i.e., transaction enabled thereby), the operator may be required to manually enter information to the Web page being displayed, using the touch-screen display panel 73 and pen-computing software, well known in the art.

In some applications, it may also be desirable to mount the 2-D bar code symbol reader 20 on the finger or head of the operator and/or to mount the remote housing 72 on a different portion of the operator's body (e.g., leg or waist). It may also be desirable to integrate all of the components of the system into a single housing worn on a specific portion of the operator's body.

In some applications, it may be desirable to provide a lightweight headset having a miniature LCD display screen 77, a microphone 78, and earphones 79, while providing the remote unit 72 with audio and video input/output ports 80 for supplying audio input to the microcomputing platform (within the remote unit) and audio and video output therefrom for driving the headset worn by the operator during in-field use of the system, using a flexible communication cable 81, as shown in FIGS. 4 and 4A. The function of the head-supported microphone 78 would be to provide speech input to the microcomputing system for processing by a speech recognition subsystem realized thereaboard using commercially available speech-recognition software (e.g., from Dragon Systems, Inc. Newton Mass.). The function of the head-mounted video-panel 77 would be to provide a convenient way of displaying HTML-encoded information pages accessed from the Internet in response to reading Applet-encoded bar code symbols using 2-D bar coded symbol reader 20. The function of the earphones 79 would be to provide a convenient way of supplying audio information encoded within HTML-encoded information pages accessed from the Internet in response to reading Applet-encoded bar code symbols using bar coded symbol reader 20. Such auxiliary devices 77, 78 and 79, interfaced with the forearm-supported Internet-terminal 72, will provide the operator with additional freedom to carry out his or her operations.

Modifications to The Illustrative Embodiments of the Internet-Based Transaction-Enabling Systems of the Present Invention Instead of using a laser scanning module to construct the Internet Access Terminals of the present invention shown in FIGS. 1, 2, 3, and 4, one may use 2-D CCD-type bar code scanning engines (or modules) employing LEDs to illuminate bar code symbols in the scan field, and CCD-type linear or array devices for capturing images thereof for subsequent decode processing. Examples of CCD scanning modules that can be used to construct CCD-based Internet Access Terminals according to the present invention can be found in the following U.S. Pat. Nos.: 5,550,366; 5,354,977; 5,291,009; 5,484,994; 5,349,172; and 5,532,467; each being incorporated herein by reference in its entirety.

Universal Transaction-Enabling Method of the Present Invention

Having described various illustrative embodiments of the Internet-based Transaction-Enabling Systems of the present invention, it is now appropriate to describe how such systems can be used to carry out information-related transactions over the Internet using bar code symbols embedded with transaction-enabling Java-Applets.

Figure 6:
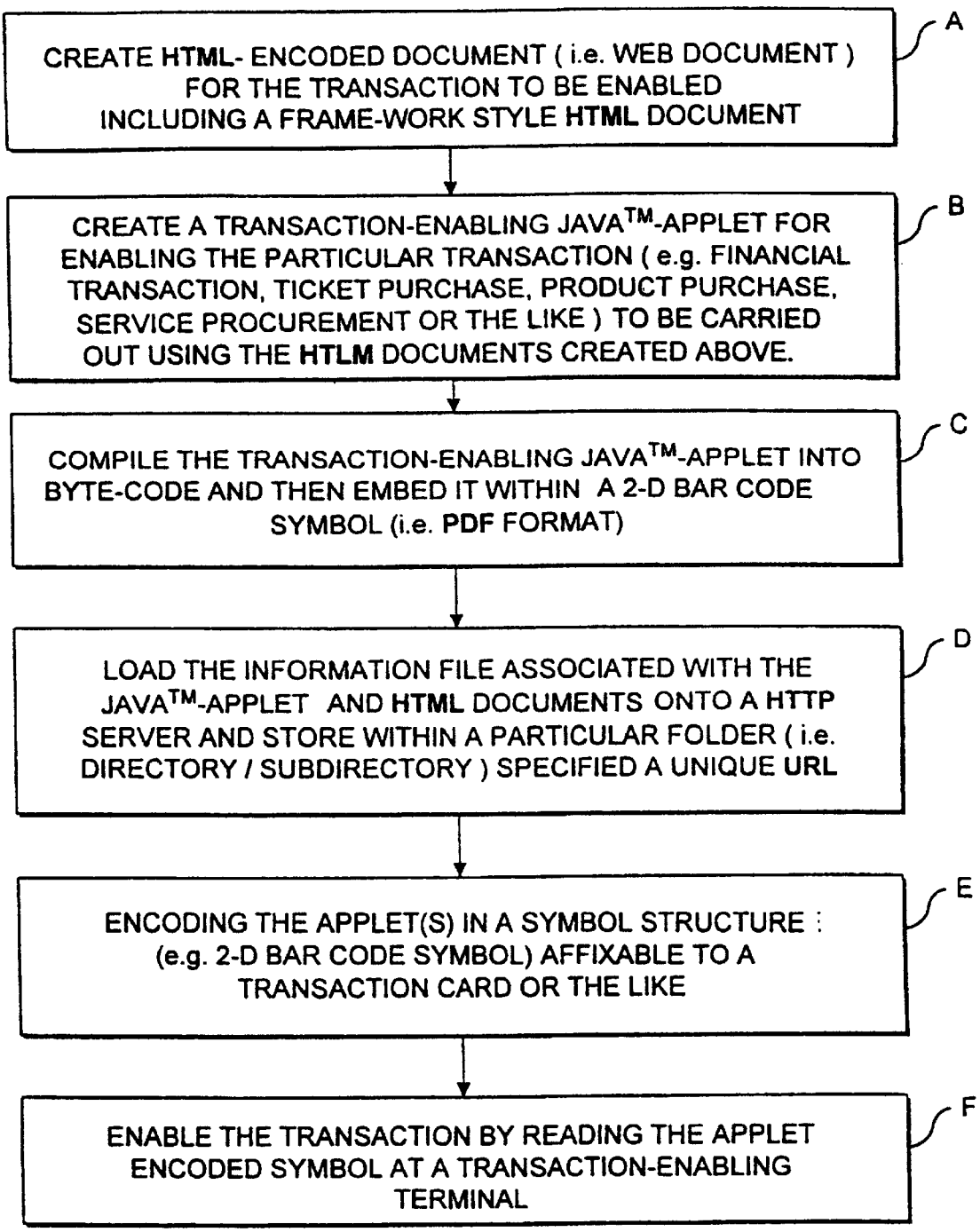
FIG. 6 is a flow chart setting forth the steps involved in practicing the transaction-enabling method of the present invention over the Internet.

In connection therewith, reference shall be made to FIG. 6, wherein the flow chart illustrated therein sets forth the steps involved in practicing the Transaction-Enabling Methodology hereof over the Internet.

Figure 7:
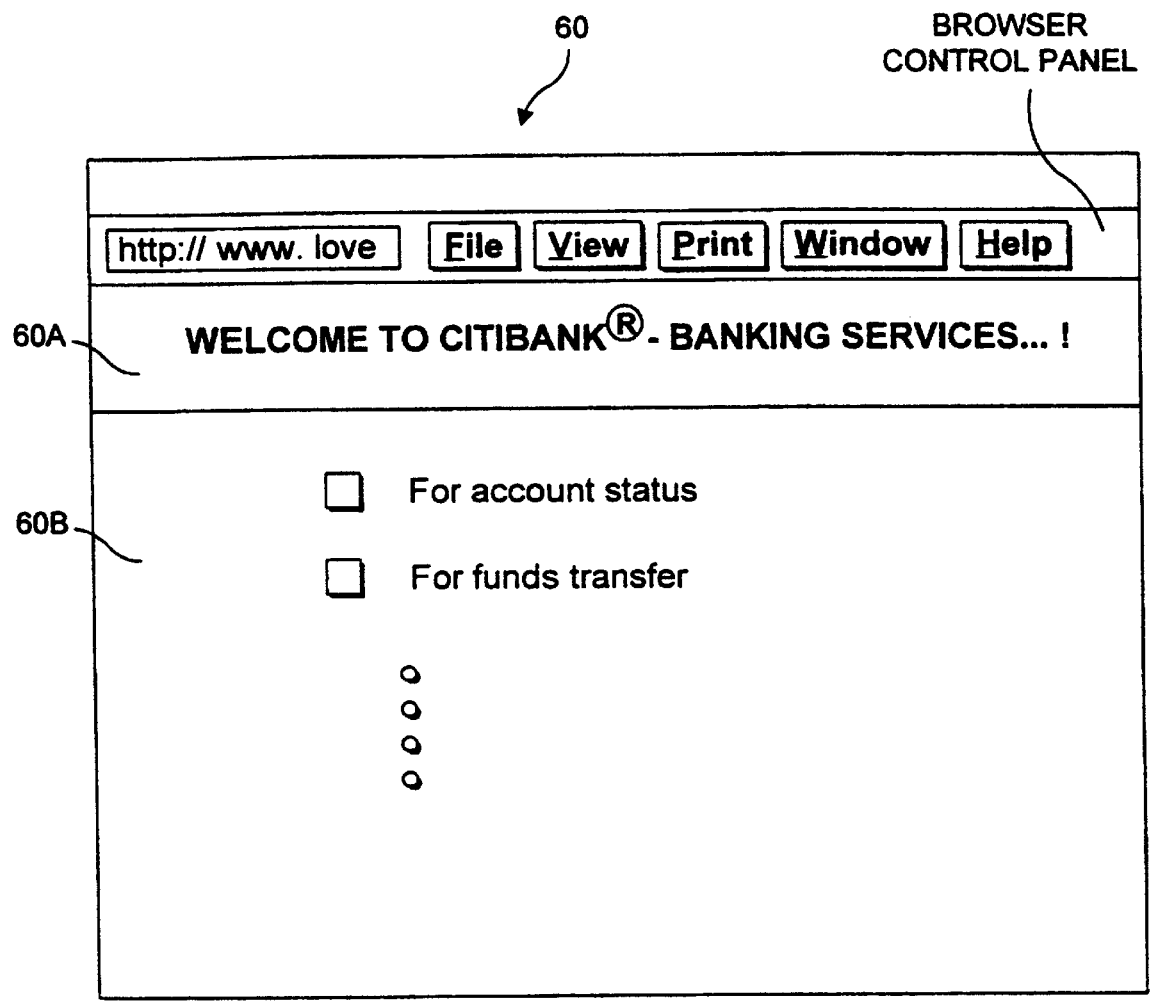
FIG. 7 is a schematic diagram of a display screen on a bar code driven Internet access system of the present invention, showing a conventional Internet browser display screen displaying a two-frame display framework which serves to enable the transaction associated with an Applet encoded with a scanned Applet-encoded bar code symbol.

As illustrated at Block A in FIG. 6, the method involves creating a transaction-serving Web document (i.e., HTML-encoded document) which shall function as the "server" for the transaction to be enabled over the Internet. This Web document can be created using commercially available HTML-editing and/or Web-page development tools (e.g., Page Mill 2.0 from Adode, Inc.) well known in the art. As shown in FIG. 7, the transaction-serving Web document can be expressed as a Netscape-style "framework" having several display frames particularly designed to carry out the marketing objectives of the information-related service that is to be delivered to the customer, consumer or client accessing this Web page. Optionally, this Web page may also contain hot-links to other Web pages that relate somehow to the information-related transaction to be enabled or service to be provided.

As shown in FIG. 7, the upper (sponsor) display frame 60A of the framework-style interface can be used to identify the sponsor of the information-based service to be enabled over the Internet, as well as provide a description of the service to be rendered and its advantages to the consumer. The lower (transaction) display frame 60B can be used to display HTML-encoded documents (pages) designed to facilitate carrying out the particular transaction under design. Notably, such HTML documents will be specified by the nature of the transaction be enabled. Typically, the HTML documents displayed in display frame 60B will be form-type HTML documents which request particular kinds of information from the user, and that the user send the completed form back to the originating HTTP server 2. Information contained in the HTML form document is received by the HTTP server 2 and then passed to a common gateway interface (CGI) well known in the art, which extracts information therefrom and queries a relational database, or the like. Information obtained from the database is then placed into an HTML (output) document and sent to the requesting Internet access terminal where it is then displayed in display frame 60B for review by the Internet user. In some instances, the information obtained from the queried database may be put into another form-type HTML document and sent to the requesting Internet access terminal where it is displayed in transaction display frame 60B for review and response by the user.

As indicated at Block B of FIG. 6, a transaction enabling Java™-Applet (or set thereof) is also created along with the development of the HTML-encoded documents described above. Preferably, these tasks are carried out in side by side manner as they are inter-related. Such Applets can be created using Java-Applet application programming interfaces (APIs) and development tools (e.g., JavaScript™ authoring tool, Jamba™ software authoring tool, and/or Java Beans™ software authoring tool) well known in the programming art. Notably, this step will typically involve designing one or more CGIs providing access to databases containing particular kinds of information required to carry out to deliver the information service under design. In general, the function of each transaction-enabling Java-Applet is to enable a particular information-related transaction (e.g., financial transaction; ticket purchase; information purchase; product purchase; service procurement; and the like). Preferably, each transaction-enabling Applet will be designed to produce easy to follow information display screens at the client-side of the system, which can be followed by users having very little (if any) computing or Internet-browsing skills. During the transaction design process, various considerations should be accorded to the sequential flow of the information display screens, queries and choices presented therein, decision-loop structures, and the like.

Then, as indicated at Block C in FIG. 6, each transaction-enabling Java-Applet(s) is compiled into bytecode and then embedded within a 2-D bar code symbol (e.g. of the PDF type) in the form of a new HTML APPLET. The Applet element adheres to the follow general syntax (note that [ ] identifies optional parameters):

<APPLET
[CODEBASE =codebaseURL]
CODE-appletFile
[ALT=alternateText]
[NAME=appletInstanceName]
[<PARAM NAME=Attribute1 VALUE=value >]
[<PARAM NAME=Attribute2 VALUE=value >]
[alternateHTML]
</APPLET>

The optional <PARAM> tag lets one specify applet-specific attributes that the applet can retrieve as Strings. These Strings can be used in an HTML document to customize the Applet's behavior and supply their respective values lie command-line variables.

CODEBASE and CODE are parameters specified by the first part of the APPLET. The Java-enabled Web browser uses these parameters to locate the Applet code on the hosting HTTP server. CODEBASE directs the Java-enabled Web browser to look for code in the classes directory associated with the URL of transaction-enabling HTML document. The CODE parameter provides the name of the Java code file that is to be loaded from the hosting HTTP server. Any other class files used by the Applet are loaded from the Codebase Directory as well. CODEBASE is an optional parameter; if it is not specified, the Java-enabled Web browser looks for class files in the HTML document's directory. It is important that the use of upper/lower cases in both the class name and the filename are identical.

The ALT parameter designates a string to be displayed if the browser understands the <APPLET>tag but does not have Java capabilities. Netscape 2.0 allows turning the Java interpreter on or off via a check box under Options on the Security Preferences menu. The ALT parameter is a way to remind users to turn Java back on after turning it off to avoid wasting time on slow applets (as can often occur on Web pages).

Applets that coexist in an encoded bar code symbol (or on a transaction-enabling Web page) communicate by means of the NAME parameter. The AppletContext method getApplet (String name) returns a reference to the named Applet if it can be found in the encoded bar code symbol and then allows communication between Applets.

The PARAM tag is used in transferring text information to your applet code using the getParameter(String param_name) applet method. Since the parameter-matching code is not case sensitive and quote marks are parsed out, the following tags are equivalent:

<PARAM name=EMAIL

<param NAME=EMAIL

<param name="email"

Between the last <PARAM> tag and the </APPLET> tag, text and HTML code can be designated for display if the Web browser of a particular client system cannot recognize the <APPLET> tag. This is a good area for a message which directs users to a "vanilla" version of the transaction-enabling Web page.

The final element of the Applet tag must be </applet> in order to tell the Web browser that the applet has ended.

For additional details pertaining to Applet construction and embedding techniques, reference can be made to "JAVA" (1997) by Ed Tittel and Bill Brogden, published by IDG Books Worldwide, Inc., incorporated herein by reference.

As indicated at Block D in FIG. 6, the information files associated with the transaction-serving HTML document and each embedded Java-Applet (e.g., code in the classes directory associated with the HTML document's URL, Java code files, class files used by the Applet, etc.) are then loaded onto an HTTP server and stored within the file management system thereof in a conventional manner. The location of the transaction-enabling HTML-encoded document will be uniquely, specifiable by a URL (e.g., http://www.mastercard.com/acctinfo/request.html) which will be encoded within the Applet.

As indicated at Block E in FIG. 6, the transaction enabling Applet is then encoded within a symbol structure such as a 2-D bar code symbol. Once the Applet is encoded within a symbol structure (i.e., PDF-type bar code), the location of the transaction-enabling Web documents underlying the same should not be moved within its designated HTTP server to ensure that the transaction-enabling Web document (providing the framework-style interface) will be automatically launched upon reading and execution of the Applet-encoded 2-D bar code symbol.

As indicated at Block F in FIG. 6, the Internet-based Transaction-Enabling System is now ready to deliver the information-related service associated with the Java-Applet embedded within the 2-D bar code symbol structure (applied to the transaction card or printed in a transaction guide or listing). To enable a desired transaction, all the consumer, customer or client has to do is to read the Applet-encoded symbol on his or her transaction card using the bar code symbol reader provided at a Transaction Enabling Terminal of the present invention, as shown in FIGS. 1,2,3,4 or 5. In response to this automatic symbol reading operation, the Java-enabled browser at the Transaction-Enabling Terminal will automatically request the transaction-enabling Web document(s) specified by the Applet recovered from the decoded bar code symbol, and then automatically display HTML document(s) designed to provide a framework-style interface, as shown in FIG. 7, for enabling the transaction. In the illustrative embodiment shown in FIG. 7, a two-frame display frame work is shown. Preferably, the upper display frame 60A of the Transaction-Enabling Terminal will display the name of the company sponsoring or enabling the information-based transaction, whereas the lower display frame 60B will display various graphical icons which the customer is prompted to select in order to select a transactional service. The icon selection can be made by touching a touch-screen display panel, or by making a key-entry operation, as the case may be. Preferably, making a selection will automatically launch one or more Java-Applets and thus initiate the particular transaction associated therewith, or a particular aspect thereof.

In an alternative embodiment of the present invention, the Applet authors can embed a transaction-enabling Java-Applet within a 2-D PDF-type bar code symbol so that the Java-Applet is self-executing (i.e., automatically initiated upon scanning and input to the Java-enabled browser). This modification, achievable through HTML-encoding and/or Java-Applet encoding, will operate to initiate the transactional process represented by the embedded Java-Applet, but would still allow the customer to conduct the transaction at a pace and speed suitable to his or her personal desire.

As the Java-Applet is executing in the intended manner by its designer (i.e., author), the customer simply follows the information display screens choreographed thereby to conduct the information-related transaction and to receive the service associated therewith at a pace and speed consistent with the customers desire. During the transaction, audio information can be delivered to the customer, as well as graphically displayed information.

At the end of the transaction, the Internet Transaction-Enabling Terminal of the present invention can produce a printed receipt for the customer as proof of service and the associated transaction. Optionally, telephone assistance can also be provided at the Internet Transaction-Enabling Terminal in the event that the customer needs to speak with a human representative for additional assistance.

An advantage of the method of the present invention detailed above is that any computer system (e.g., Web-enabled thin-client computer, or Internet-enabled kiosk, provides with a bar code reader) can be automatically transformed into a Universal Transaction Machine (UTM). Consequently, the need to construct specialized transaction machines can now be avoided in numerous applications.

Having described the illustrative embodiments of the present invention, several modifications readily come to mind.

In order to indicate that a particular printed publication or object bears a Applet-encoded bar code symbol according to the present invention, and not a conventional bar code symbol, it may be advantageous to print transaction-identifying indicia below the encoded bar code symbol. This printing convention, once adopted, will help consumers determine which bar code symbols provide "Internet Transaction Access", in contrast with other types of bar code symbols.

Java-Applet encoded bar code symbols can be put to many uses. For example, Java-encoded bar code symbols can be applied to shipped packages and parcels in order to access up-to-date delivery instructions, and/or shipping charges to be paid on a COD basis at the site of delivery.

Java-encoded bar code symbols can be applied to consumer products in order to: (i) access information pertaining to present or future sales (e.g., specials) and/or advertising; (ii) carrying out consumer purchase transactions using the portable data terminal shown in FIG. 17, or the like.

Java-encoded bar code symbols can be applied to preprinted stock trading cards and forms in order to facilitate the purchase and sale of stock among traders, and specialists in the market.

Java-encoded bar code symbols can be printed upon financial instruments (e.g., derivative instruments) and used to access information necessary to compute and display the value or price thereof in a dynamically changing marketplace. In such applications, information from a number of Internet servers may be required to compute and display the cost, price or value of the instrument at any given moment in time.

Java-enabled bar code symbols can also be applied to any object (e.g., print media) in order to access, process and display Internet-based multi-media information (having graphic and/or audio content) to one or more users upon reading Java-applet encoded bar code symbol. By simply reading a Java-Applet encoded 2-D bar code symbol, pictures, text, computed figures, speech messages, music and/or video clips can be displayed at the Internet Access System hereof.

It is understood that the Internet-based Transaction-Enabling System and Method of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

What is claimed is:

1. An Internet-based client-server transaction-enabling system for enabling information-related transactions over the infrastructure of the Internet, comprising:

a remote http information server connected to the Internet, for storing information files associated with a transaction-enabling Java-Applet for use in enabling an information-related transaction over the Internet, said transaction-enabling Java-Applet comprising HTML Applet code and said information files; and an Internet-enabled client terminal for reading a bar code symbol encoded with said HTML Applet code and for downloading said information files from said remote http information server and executing said downloaded information files on said Internet-enabled client terminal, said Internet-enabled client terminal including a Java-enabled browser program for executing said information files associated with said transaction-enabling Java-Applet;

a display screen for visually displaying one or more HTML-encoded documents generated during the execution of said information files on said Internet-enabled client terminal, a data entry means for entering data into said Internet-enabled client terminal, and a code symbol reader, operably connected to said Java-enabled browser program, for reading a bar code symbol encoded with said HTML Applet code, and producing data representative of said HTML Applet code and providing said produced data to said Java-enabled browser program for downloading said information files from said remote http information server to said Internet-enabled client terminal and executing said downloaded information files on said Internet-enabled client terminal to enable said information-related transaction, wherein, when said bar code symbol is read by said code symbol reader, produced data representative of said HTML Applet code is automatically produced and provided to said Java-enabled browser program, and whereupon said Java-enabled browser program automatically downloads said information files from said remote http information server and executes said downloaded information files on said Internet-enabled client terminal and thereby enables the user to conduct said information-related transaction over the Internet at said Internet-enabled client terminal.

2. The Internet-based client-server transaction-enabling system of claim 1, wherein said Java-Applet encoded bar code symbol is a 1-D bar code symbol encoded with the code of said transaction-enabling Java-Applet.

3. The Internet-based client-server transaction-enabling system of claim 1, wherein said Java-Applet encoded bar code symbol is a 2-D bar code symbol.

4. The Internet-based client-server transaction-enabling system of claim 3, wherein said code symbol reader is a bar code symbol reader for reading said 2-D bar code symbol.

5. The Internet-based client-server transaction-enabling system of claim 4, wherein said bat code symbol reader is selected from the group consisting of:

a laser scanning bar code symbol reader, a CCD-type bar code symbol, and a wand-type bar code symbol reader.

6. The Internet-based client-server transaction-enabling system of claim 1, wherein said Internet-enabled client terminal comprises a hand-supportable data terminal with a bar code symbol reader integrated therewith.

7. The Internet-based client-server transaction-enabling system of claim 1, wherein said Internet-enabled client terminal comprises a kiosk-type device having a bar code symbol reader for reading Java-Applet encoded bar code symbols.

8. The Internet-based client-server transaction-enabling system of claim 1, wherein said Internet-enabled client terminal comprises a body-wearable computer system.

* * * * *